(12) United States Patent
VanTassel et al.

(10) Patent No.: US 10,815,807 B2
(45) Date of Patent: Oct. 27, 2020

(54) SHROUD AND SEAL FOR GAS TURBINE ENGINE

(71) Applicant: General Electric Company, Schenectady, NY (US)

(72) Inventors: Brad Wilson VanTassel, Easley, SC (US); Steven Paul Byam, Fountain Inn, SC (US); Joseph Anthony Weber, Simpsonville, SC (US); Evan Andrew Sewall, Greer, SC (US); Travis J Packer, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 420 days.

(21) Appl. No.: 15/995,082

(22) Filed: May 31, 2018

(65) Prior Publication Data

US 2019/0368364 A1 Dec. 5, 2019

(51) Int. Cl.
| | | |
|---|---|---|
| *F01D 25/14* | (2006.01) |
| *F01D 9/06* | (2006.01) |
| *F01D 9/04* | (2006.01) |
| *F01D 11/08* | (2006.01) |

(52) U.S. Cl.
CPC ............ *F01D 9/065* (2013.01); *F01D 9/041* (2013.01); *F01D 11/08* (2013.01); *F01D 25/14* (2013.01); *F05D 2240/11* (2013.01); *F05D 2260/20* (2013.01)

(58) Field of Classification Search
None
See application file for complete search history.

(56) References Cited

U.S. PATENT DOCUMENTS

| | | | | |
|---|---|---|---|---|
| 5,088,888 A | * | 2/1992 | Bobo | ........... F01D 11/005 277/644 |
| 5,609,469 A | | 3/1997 | Worley | |
| 6,270,311 B1 | * | 8/2001 | Kuwabara | ........... F01D 11/005 415/110 |
| 6,340,285 B1 | | 1/2002 | Gonyou et al. | |
| 6,893,215 B2 | * | 5/2005 | Kuwabara | ........... F01D 11/005 415/115 |

(Continued)

FOREIGN PATENT DOCUMENTS

EP   1887191 A2   2/2008

OTHER PUBLICATIONS

General Electric Company; International Patent Application No. PCT/US2019/033882; International Search Report; dated Aug. 13, 2019; (2 pages).

*Primary Examiner* — Michael Lebentritt
(74) *Attorney, Agent, or Firm* — Dority & Manning, P.A.

(57) ABSTRACT

A turbine of a gas turbine engine that includes a stationary shroud ring having inner shroud segments circumferentially stacked about a hot gas path. The inner shroud segments may include a first inner shroud segment that includes: a cooling configuration having cooling channels configured to receive and direct a coolant through an interior of the first inner shroud segment, where each of the cooling channels extends lengthwise between a first end and a second end that includes an outlet formed through an exterior surface of the first inner shroud segment; a circumferential edge; a slot formed in the circumferential edge; and a sealing member positioned within the slot. The outlet of at least one of the cooling channels may be positioned within the slot.

20 Claims, 4 Drawing Sheets

(56) References Cited

U.S. PATENT DOCUMENTS

| | | | |
|---|---|---|---|
| 8,585,354 B1* | 11/2013 | Liang | F01D 11/008 |
| | | | 415/135 |
| 8,905,708 B2 | 12/2014 | Weber et al. | |
| 9,353,638 B2* | 5/2016 | Rathmann | F01D 11/005 |
| 9,518,478 B2 | 12/2016 | Smith et al. | |
| 2001/0005555 A1 | 6/2001 | Kreis | |
| 2003/0012647 A1* | 1/2003 | Shiozaki | F01D 5/18 |
| | | | 415/191 |
| 2007/0031241 A1* | 2/2007 | Tibbott | F01D 5/081 |
| | | | 415/115 |
| 2009/0324388 A1* | 12/2009 | Takamura | F01D 5/081 |
| | | | 415/116 |
| 2012/0177479 A1* | 7/2012 | Azad | F01D 5/187 |
| | | | 415/115 |
| 2012/0263576 A1* | 10/2012 | Lacy | F01D 25/12 |
| | | | 415/115 |
| 2013/0177386 A1* | 7/2013 | Weber | F01D 11/005 |
| | | | 415/1 |
| 2015/0118022 A1* | 4/2015 | Weber | F01D 11/005 |
| | | | 415/116 |
| 2015/0118033 A1* | 4/2015 | Smith | F01D 25/12 |
| | | | 415/175 |
| 2015/0233258 A1* | 8/2015 | Kareff | F01D 5/30 |
| | | | 60/722 |
| 2018/0245474 A1* | 8/2018 | Alexander | F01D 5/087 |

* cited by examiner

SHROUD AND SEAL FOR GAS TURBINE ENGINE

BACKGROUND OF THE INVENTION

The subject matter disclosed herein relates to hot gas path components within the turbine of a gas turbine engine, and, more specifically, but not by way of limitation, to the interior structure and cooling configuration of stationary shrouds formed about turbine rotor blades.

Gas turbine engines include compressor and turbine sections in which rows of blades are axially stacked in stages. Each stage typically includes a row of circumferentially-spaced stator blades, which are fixed, and a row of rotor blades, which rotate about a central turbine axis or shaft. In operation, generally, the compressor rotor blades are rotated about the shaft, and, acting in concert with the stator blades, compress a flow of air. This supply of compressed air then is used within a combustor to combust a supply of fuel. The resulting flow of hot expanding combustion gases, which is often referred to as working fluid, is then expanded through the turbine section of the engine. Within the turbine, the working fluid is redirected by the stator blades onto the rotor blades so to power rotation. Stationary shrouds may be constructed about the rotor blades to define a boundary of the hot gas path. The rotor blades are connected to a central shaft such that the rotation of the rotor blades rotates the shaft, and, in this manner, the energy of the fuel is converted into the mechanical energy of the rotating shaft, which, for example, may be used to rotate the rotor blades of the compressor, so to produce the supply of compressed air needed for combustion, as well as, rotate the coils of a generator so to generate electrical power. During operation, because of the high temperatures, velocity of the working fluid, and rotational velocity of the engine, many of the components within the hot gas path become highly stressed by extreme mechanical and thermal loads.

Many industrial applications, such as those involving power generation and aviation, still rely heavily on gas turbine engines, and because of this, the design of more efficient engines is an ongoing objective. Even incremental advances in machine performance, efficiency, or cost-effectiveness are meaningful in the competitive markets that have evolved around this technology. While there are several known strategies for improving the efficiency of gas turbines—for example, increasing the size of the engine, firing temperatures, or rotational velocities—each generally places additional strain on hot gas path components that are already highly stressed. As a result, there remains a general need for improved apparatus, methods or systems for alleviating such stresses or, alternatively, enhancing the durability of such components so they may better withstand them. For example, extreme temperature and pressure within the hot gas path stress stationary shrouds and seals formed between adjoining shroud segments, causing degradation and shortening the useful life of the component. Novel shroud designs are needed that optimize coolant and sealing efficiency, while also being cost-effective to construct, durable, and flexible in application.

BRIEF DESCRIPTION OF THE INVENTION

The present application describes a turbine of a gas turbine engine that includes a stationary shroud ring having inner shroud segments circumferentially stacked about a hot gas path. The inner shroud segments may include a first inner shroud segment that includes: a cooling configuration having cooling channels configured to receive and direct a coolant through an interior of the first inner shroud segment, where each of the cooling channels extends lengthwise between a first end and a second end that includes an outlet formed through an exterior surface of the first inner shroud segment; a circumferential edge; a slot formed in the circumferential edge; and a sealing member positioned within the slot. The outlet of at least one of the cooling channels may be positioned within the slot.

BRIEF DESCRIPTION OF THE DRAWINGS

These and other features of this disclosure will be more completely understood and appreciated by careful study of the following more detailed description of exemplary embodiments of the disclosure taken in conjunction with the accompanying drawings, in which.

DETAILED DESCRIPTION OF THE INVENTION

The present disclosure is directed to systems and methods for cooling and sealing components of a turbine, specifically, an inner shroud segment, disposed along a hot gas path. As will be seen, the inner shroud segment of the present invention includes an internal cooling configuration (or "cooling configuration") in which particular channels are formed within the interior of the inner shroud segment and a sealing arrangement.

As used herein, "downstream" and "upstream" are terms that indicate a flow direction of a fluid through a channel or passage. Thus, for example, relative to the flow of working fluid through the turbine, the term "downstream" refers to a direction that generally corresponds to the direction of the flow, and the term "upstream" generally refers to the direction that is opposite of the direction of flow. The term "radial" refers to movement or position perpendicular to an axis or center line. It may be useful to describe parts that are at differing radial positions with regard to an axis. In this case, if a first component resides closer to the axis than a second component, it may be stated herein that the first component is "radially inward" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis.

Figure 1:
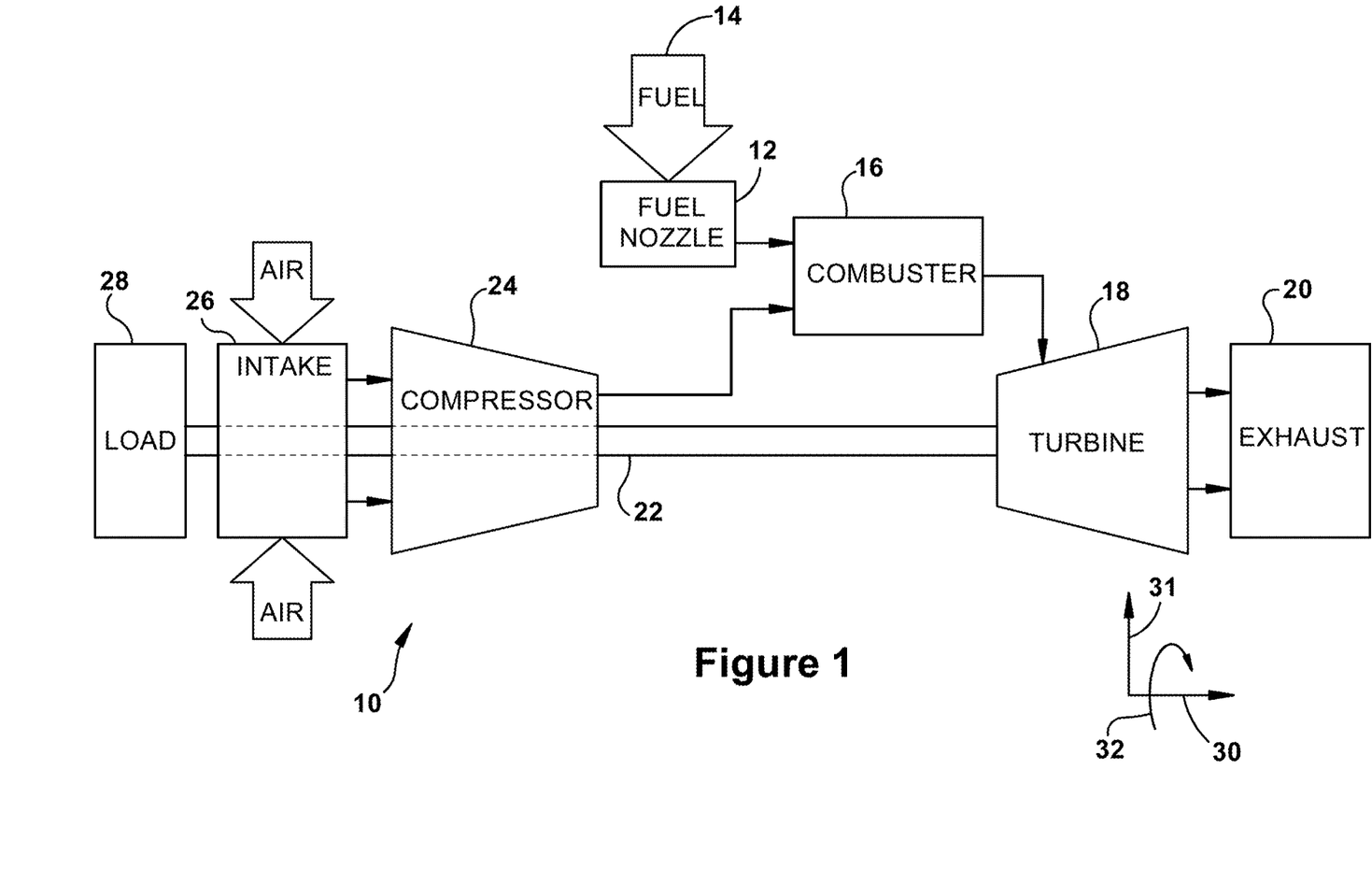
FIG. 1 is a block diagram of a gas turbine engine in which shrouds of the present disclosure may be used.

Turning to the drawings, FIG. 1 is a block diagram of a gas turbine system or engine (or "gas turbine") 10. As described in detail below, gas turbine 10 may employ a shroud segment having cooling channels and seals, which reduce stress modes in such hot gas path components and improve the efficiency of the engine. Gas turbine 10 may use liquid or gas fuel, such as natural gas and/or a hydrogen rich synthetic gas. As depicted, fuel nozzles 12 intake a fuel supply 14, mix the fuel with an oxidant, such as air, oxygen, oxygen-enriched air, oxygen reduced air, or any combination thereof. Once the fuel and air have been mixed, the fuel nozzles 12 distribute the fuel-air mixture into a combustor 16 in a suitable ratio for optimal combustion, emissions, fuel consumption, and power output.

Gas turbine 10 may include one or more fuel nozzles 12 located inside one or more combustors 16. The fuel-air mixture combusts in a chamber within combustor 16, thereby creating hot pressurized exhaust gases. Combustor 16 directs the exhaust gases (e.g., hot pressurized gas) through a transition piece into alternating rows of stationary stator blades and rotating rotor blades, which causes rotation of a turbine section or turbine 18 within a turbine casing. The exhaust gases expand through turbine 18 and flow toward an exhaust outlet 20. As the exhaust gases pass through turbine 18, the gases force the rotor blades to rotate a shaft 22. Shaft 22 may operably connected turbine 18 to a compressor 24. As will be appreciated, shaft 22 defines a center axis of gas turbine 10, i.e., turbine 18 and compressor 24. Relative to the center axis, an axial direction 30 is defined, which represents movement along the center axis, a radial direction 31 is defined, which represents movement toward or away from the center axis, and a circumferential direction 32 is defined, which represents movement around the center axis.

Compressor 24 also includes blades coupled to shaft 22. As shaft 22 rotates, the blades within compressor 24 also rotate, thereby compressing air from an air intake 26 through compressor 24 and into fuel nozzles 12 and/or combustor 16. A portion of the compressed air (e.g., discharged air) from compressor 24 may be diverted to turbine 18 or its components without passing through combustor 16. The discharged air may be utilized as a coolant to cool turbine components, such as shrouds and nozzles on the stator, along with rotor blades, disks, and spacers on the rotor. Shaft 22 may also be connected to a load 28, which may be a vehicle or a stationary load, such as a propeller on an aircraft or an electrical generator in a power plant.

Figure 2:
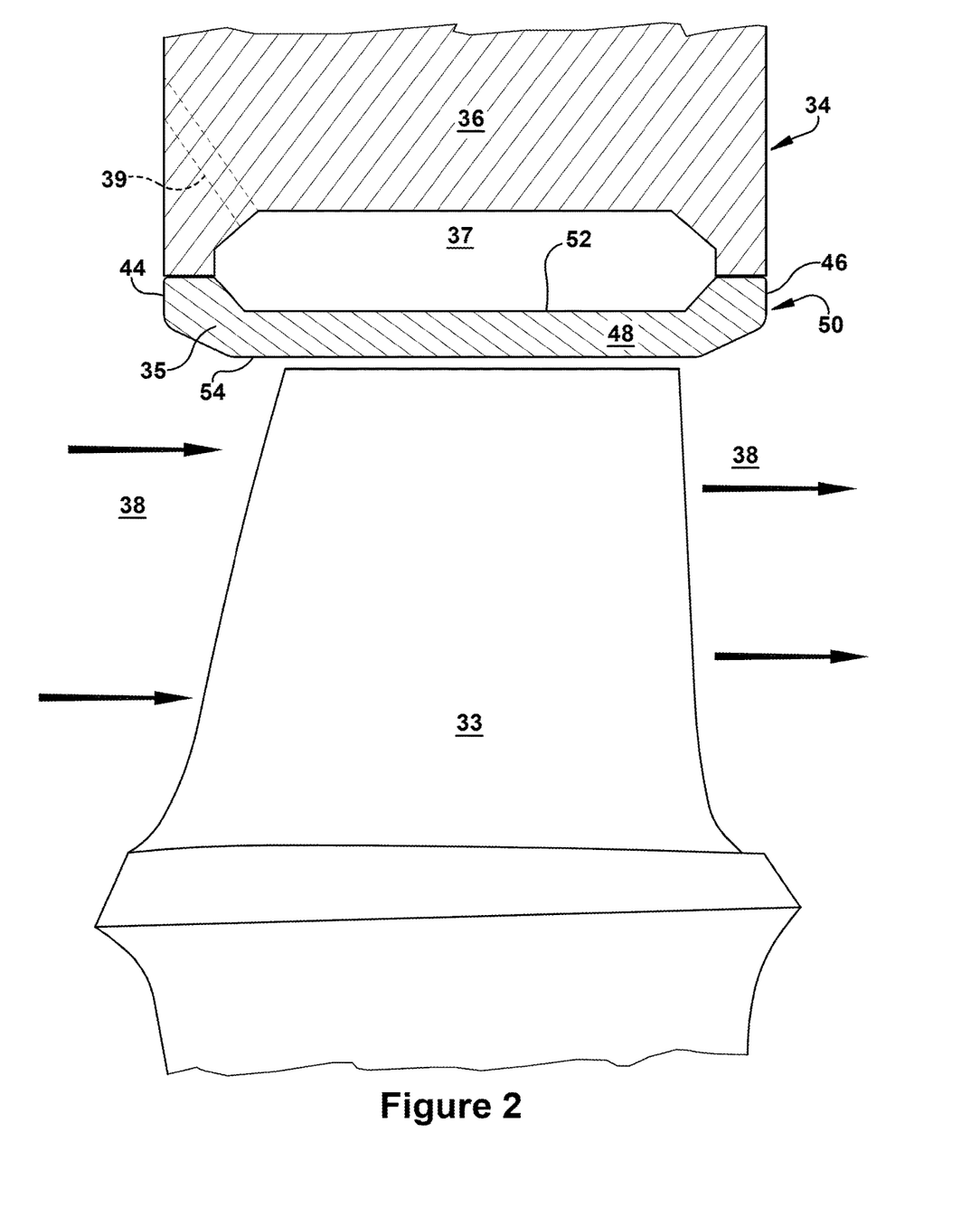
FIG. 2 is a side view of a hot gas path having a rotor blade and stationary shroud with which the seal of the present disclosure may be used.

FIG. 2 shows an exemplary axial section of a hot gas path 38 as may be included within a turbine of a gas turbine. As shown, hot gas path 38 may include a rotor blade 33 that is part of a row of rotor blades. The row of rotor blades may be disposed in serial flow relationship axially aft or downstream of a row of stationary turbine stator blades (not shown). Hot gas path 38 may also include a stationary shroud segment 34, which is circumferentially disposed about and radially outward (or "outboard") of rotor blade 33. As illustrated, shroud segment 34 may include an inner shroud segment 35 that resides radially inward (or "inboard") of an outer shroud segment 36. A cavity 37 may be formed between inner and outer shroud segments 35, 36. Typically, cooling air is provided to cavity 37 through one or more coolant supply channels 39 formed through outer shroud segment 36. As will be seen, such cooling air may then be directed into internal cooling passages or channels formed through the interior of inner shroud segment 35.

As will be appreciated, each shroud segment 34 may include one or more inner and outer shroud segments 35, 36. Multiple shroud segments 34 then may be circumferentially stacked to form a shroud ring disposed just outboard of the row of rotor blades, with each of the shroud segments 34 having one or more inner shroud segments 35 coupled to one or more outer shroud segments 36. Within this assembly, inner shroud segments 35 may be circumferentially stacked such that a ring of inner shroud segments surrounds the row of rotor blades 33. Given this arrangement, inner shroud segment 35 and outer shroud segment 36 may have an arcuate shape or arcuately shaped surfaces.

In accordance with its general configuration and orientation within turbine 18, as used herein, inner shroud segment 35 includes an upstream or leading edge 44 that opposes a downstream or trailing edge 46, which are so called given the flow direction of working fluid through the hot gas path. Extending between leading edge 44 and trailing edge 46, inner shroud segment 35 includes circumferentially oriented and opposing edges, which will be referred to herein as circumferential edges or, more specifically, first circumferential edge 48 and second circumferential edge 50. Inner shroud segment 35 also is generally formed by a pair of opposed lateral sides or faces 52, 54 that extend between leading and trailing edges 44, 46 and first and second circumferential edges 48, 50. As used herein, lateral faces 52, 54 of inner shroud segment 35 may include an outboard face 52 and inboard face 54. As will be appreciated, outboard face 52 is directed toward outer shroud segment 36 (and cavity 37 that may be formed between inner shroud segment 35 and outer shroud segment 36), while inboard face 54 is directed toward hot gas path 38, where it defines an outer radial boundary thereof. Inboard face 54 of inner shroud segment 35 may be substantially planar except for a gradual curvature in between first and second circumferential edges 48, 50.

Positioned as it is about the central axis of turbine 18, the shape and dimensions of inner shroud segment 35 may further be described relative to axial, radial and circumferential directions 30, 31, 32 of turbine 18. Thus, opposed leading and trailing edges 44, 46 are offset in the axial direction 30. As used herein, the distance of this offset in the axial direction 30 is defined as the width dimension (or "width") of inner shroud segment 35. Additionally, opposed first and second circumferential edges 48, 50 of inner shroud segment 35 are offset in the circumferential direction 32. As used herein, the distance of this offset in the circumferential direction 32 is defined as the length dimension (or "length") of inner shroud segment 35. Finally, the opposed outboard and inboard faces 52, 54 of inner shroud segment 35 are offset in the radial direction 31. As used herein, the distance of this offset in the radial direction 31 is defined as the height dimension (or "height") of inner shroud segment 35.

Figure 3:
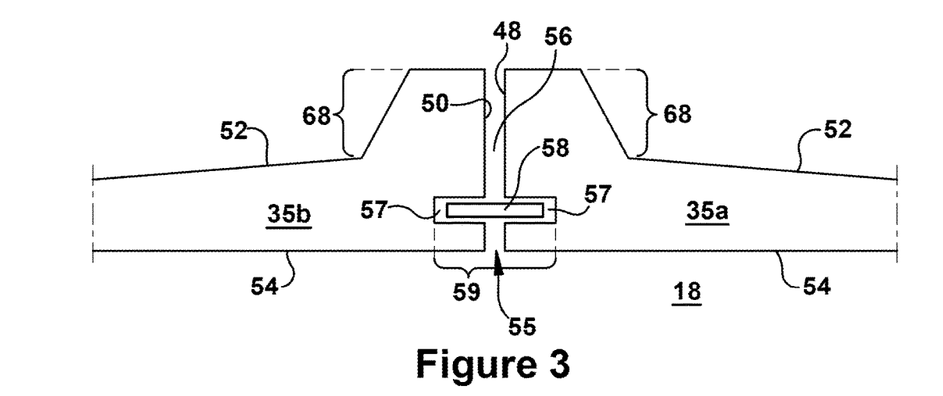
FIG. 3 is side cross-sectional view of a conventional sealing arrangement between abutting inner shroud segments.

FIG. 3 is a cross-sectional side view of a sealing arrangement or seal 55 as may be formed between adjacent first and second inner shroud segments 35a, 35b. As shown, the two inner shroud segments 35a, 35b abut one another at an interface 56 (the proportions of which have been exaggerated for purposes of description). As will be appreciated, interface 56 is formed between first circumferential edge 48 of first inner shroud segment 35a and second circumferential edge 50 of second inner shroud segments 35b. As part of seal 55, each of first circumferential edge 48 and second circumferential edge 50 includes a slot 57 formed longitudinally to receive a corresponding sealing member 58. In each case, slot 57 may extend from leading edge 44 to trailing edge 46 of inner shroud segments 35a, 35b. Positioned within slots 57, sealing member 58 also may be configured to extend from leading edge 44 to trailing edge 46 of inner shroud segments 35a, 35b. It will be appreciated that once the adjacent inner shroud segments 35a, 35b are assembled to form interface 56, slots 57 cooperate or align to form a continuous seal chamber 59 that spans across interface 56. As will be appreciated, seal chamber 59 is configured to accept a correspondingly shaped sealing member 58 such that seal chamber 59 restricts movement of sealing member 58. In this way, seal chamber 59 maintains sealing member 58 in a proper sealing position, i.e., so that sealing member 58 spans across the gap formed at interface 56. Sealing member 58 thereby prevents or limits exhaust gases from leaking or escaping from hot gas path 18 via interface 56. Sealing member 58 separates cool fluid, such as air, proximate to outboard face 52 of inner shroud segment 35 from hot fluid, such as hot gases of hot gas path 18, proximate to inboard face 54.

As will be appreciated, however, sealing member 58 degrades over time due to the extreme temperatures to which it is subjected given its position near hot gas path 18. Further, sealing member 58 is mechanically stressed by vibrations and/or relative movement between adjacent inner shroud segments 35. Over time, such degradation negatively impacts the performance of seal 55, allowing hot gas leakage that can damage components and negatively impact engine efficiency. While conventional seals in this region have been shown to perform adequately in certain ways, technical advances that extend component life of seal 55 or improve sealing performance could directly translate into improved efficiency and operational cost-effectiveness via reduced maintenance and downtime.

Figure 4:
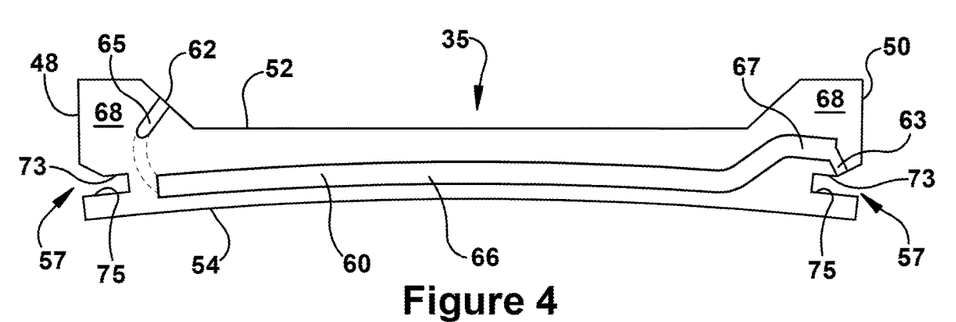
FIG. 4 is side cross-sectional view of an inner shroud segment that includes an interior cooling and sealing configuration in accordance with the present disclosure.
Figure 5:
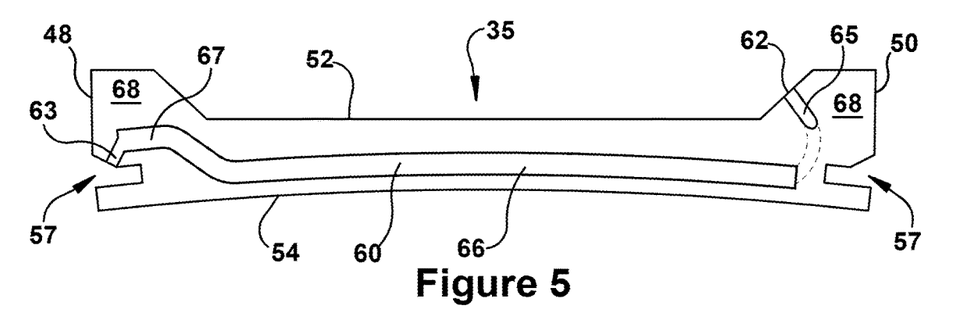
FIG. 5 is side cross-sectional view of an inner shroud segment that includes an interior cooling and sealing configuration in accordance with the present disclosure.
Figure 6:
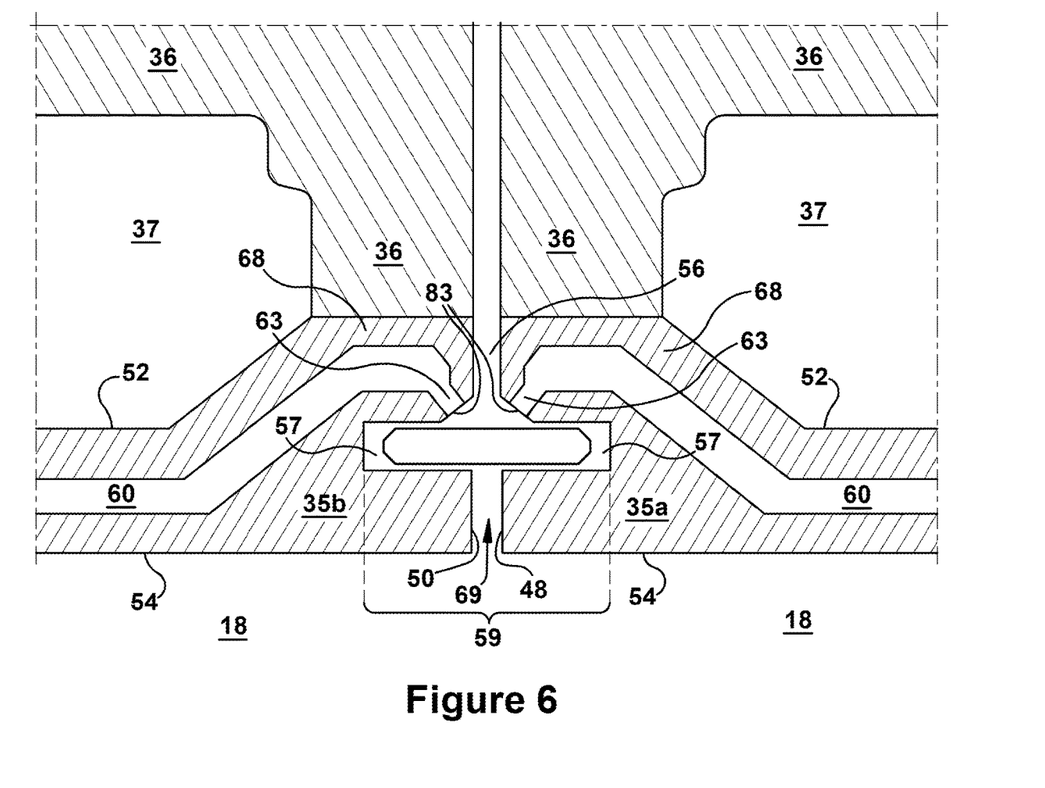
FIG. 6 is an enhanced cross-sectional view of a seal between inner shroud segments having a cooling configuration and sealing arrangement in accordance with the present disclosure.

Turning now to the present invention, FIGS. 4 and 5 illustrate side cross-sectional views of an inner shroud segment 35 having a cooling channel 60 in accordance with the present disclosure. As will be seen, to reduce seal degradation and/or improve sealing performance, exemplary embodiments of the present invention disclose inner shroud segments 35 having one or more cooling channels 60 with their respective outlets 63 positioned to supply coolant directly to slots 57 and, thus, a seal 69 formed therein. With reference also to FIG. 6—which illustrates a cross-sectional view of seal 69 according to embodiments of the present disclosure—exemplary embodiments will now be presented. For convenience, components and elements that correspond to those already identified in preceding figures are identified with similar reference numerals, but only discussed in particular, as necessary, or desirable, to an understanding of the present embodiments.

In regard to seal 69, as shown in FIG. 6, it may be formed between circumferential edges of adjacent inner shroud segments 35 in much the same way as described above for seal 55. For description purposes, the adjacent inner shrouds segments have been designated as a first inner shroud segment 35a and second inner shroud segment 35b. As indicated, first and second inner shroud segments 35a, 35b abut one another along an interface 56 formed between first circumferential edge 48 of first inner shroud segment 35a and second circumferential edge 50 of second inner shroud segment 35b. As part of seal 69, first circumferential edge 48 and second circumferential edge 50 include cooperating slots 57 formed longitudinally to receive a sealing member 58. Slots 57 may extend between leading edge 44 a trailing edge 46 of first and second inner shroud segments 35a, 35b. Positioned within slots 57, sealing member 58 also may extend from leading edge 44 to trailing edge 46 of first and second inner shroud segments 35a, 35b. It will be appreciated that once first and second inner shroud segments 35a, 35b are positioned as shown, slots 57 cooperate to form a seal chamber 59 that positions and maintains sealing member 58 in a position that spans across interface 56 and thereby seals it.

In regard to cooling channel 60, unless otherwise limited, it may broadly include any cooling passage configured for receiving and directing coolant through the interior of inner shroud segment 35. Thus, according to exemplary embodiments, cooling channel 60 may be oriented in various directions and disposed within and through various regions of inner shroud segment 35, as may be necessary to satisfy component cooling requirements. For example, cooling channel 60 may extend axially, circumferentially, and/or radially across the width, length, and/or height, respectively, of inner shroud segment 35. According to certain preferred embodiments, cooling channel 60 is oriented so that it extends lengthwise approximately in the circumferential direction 32 or along the length of inner shroud segment 35. In certain embodiments, cooling channel 60 may extend across a majority of the length of inner shroud segment 35, such as, across at least 50% of the length of inner shroud segment 35. According to alternative embodiments, cooling channel 60 may extend across at least 75% of the length of inner shroud segment 35.

Cooling channels 60 of the present disclosure may generally extend lengthwise between an inlet 62 and outlet 63, both of which may be formed on an exterior surface of inner shroud segment 35. Between inlet 62 and outlet 63, cooling channel 60 may be more specifically described as extending lengthwise between non-overlapping and sequential sections, which, for the purposes herein, are designated: an upstream section 65; middle section 66; and downstream section 67. As shown in FIGS. 4 and 5, middle section 66 may be the lengthiest section, which, according to exemplary embodiments, is substantially linear and disposed near and approximately parallel to inboard face 54. As will be appreciated, middle section of cooling channel 60 is configured in this way to provide cooling to inboard face 54. Upstream section 65 of cooling channel 60 is the section that supplies coolant to middle section 66, and, thus, upstream section 65 may extend generally between inlet 62 and middle section 66. Downstream section 67 of cooling channel 60 is the section through which coolant is expelled after usage, and, thus, downstream section 67 may extend between middle section 66 and outlet 63.

As shown most clearly in FIGS. 4 and 5, inner shroud segments 35a, 35b may include a rail portion or rail 68 at circumferential edges 48, 50. As used herein, rail 68 is a lengthwise section of increased height that is adjacent to circumferential edges 48, 50. Thus, at first and second circumferential edges 48, 50, inner shroud segment 35 may have rails 68. As depicted in FIGS. 4 through 6, in accordance with certain preferred embodiments, upstream section 65 is disposed in a rail 68 while its corresponding downstream section 67 is disposed in an opposing rail 68. For example, within rail 68, upstream section 65 of cooling channel 60 may extend in an inboard direction between an inlet 62 formed on outboard face 52 and a connection made with middle section 66, where that connection is near inboard face 54. Within opposing rail 68, downstream section 67 may extend in an outboard direction from a connection made with middle section 66. As discussed more below, downstream section 67 then may extend in an inboard direction as it nears outlet 63.

In regard to inlet 62 of cooling channel 60, according to exemplary embodiments, it may be formed on an exterior surface of inner shroud segment 35 and configured to receive a supply of coolant. For example, the exterior surface on which inlet 62 of cooling channel 60 is disposed may be a surface defined within cavity 37. In this position, as will be appreciated, inlet 62 receives coolant that is delivered to cavity 37 via coolant supply channels 39. Other configurations are also possible.

In regard to outlet 63 of cooling channel 60, according to the present disclosure, it may be disposed on either of first and second circumferential edges 48, 50 and, more particularly, on an exterior surface that defines slot 57. As used herein, slot 57 may be more particularly described as having been defined by several particular surfaces, which include an outboard surface or "ceiling" 73 (which defines a boundary of slot 57 in the outboard direction) and an inboard surface or "floor" 75 (which defines a boundary of slot 57 in the inboard direction). According to certain preferred embodiments and as shown in the figures, outlet 63 may be formed through ceiling 73 of slot 57. As illustrated most clearly in FIG. 6, outboard ceiling 73 may include a beveled portion 83 adjacent to circumferential edges 48, 50. According to certain preferred embodiments, outlet 63 may be formed through beveled portion 83 of outboard ceiling 73 of slot 57. Further, according to preferred embodiments, outlet 63 is oriented or aimed so that coolant released therefrom has an initial trajectory that includes an inboard directional component. Preferably, the initial trajectory trains coolant released by outlet 63 upon sealing member 58.

As also shown, according to certain preferred embodiments, outlet 63 of cooling channel 60 may be configured as an impingement outlet or, as also used herein, have an impingement outlet configuration. In general, an impingement outlet configuration is an outlet that impinges the flow of coolant being expelled through it via a reduction in cross-sectional flow area. For example, defined relative to a reference cooling channel having a reference outlet, the impingement outlet configuration is one in which the reference outlet has a cross-sectional flow area that is significantly reduced than the cross-sectional flow area of the reference cooling channel. Thus, as an example, the reference outlet may have a cross-sectional flow area that is less than 50% or 60% of the cross-sectional flow area of the reference cooling channel. For example, according to preferred embodiments, the cross-sectional flow area of an impingement outlet 63 may be less than 60% of the cross-sectional flow area of cooling channel 60 that corresponds to it. As will be appreciated, the narrowing cross-sectional area of this type of outlet increases the velocity of the coolant being expelled from it, thereby increasing the coolant's heat transfer coefficient and cooling effectiveness within seal 69. Additionally, the release of high velocity coolant in this manner—particularly where that release is aimed in the inboard direction—may enhance the effectiveness of seal 69. Specifically, the released coolant may pressurize interface 56 and directionally opposes hot gases entering interface 56 from hot gas path 18.

Though usage of a single such cooling channel 60 is possible, in accordance with preferred embodiments, multiple cooling channels 60 are provided within cooling configurations. For example, the views of FIGS. 4 and 5 may be understood as cross-sections taken at different positions along the width of an inner shroud segment 35 that has multiple such cooling channels 60. As illustrated by the two opposite flow directions of FIGS. 4 and 5, some of those cooling channels 60 may be oriented to direct coolant to outlets 63 formed in slot 57 disposed on first circumferential edge 48, while others of those cooling channels 60 are oriented to direct coolant to outlets 63 formed in slot 57 disposed on second circumferential edge 50. Thus, as shown in FIG. 4, a first example of cooling channel 60 extends lengthwise toward an outlet 63 formed within slot 57 disposed on second circumferential edge 50, while, as shown in FIG. 5, a second example of cooling channel 60 extends lengthwise toward an outlet 63 formed within slot 57 disposed on first circumferential edge 48. In this way, the present disclosure provides cooling configurations by which coolant that has already been circulated through interior regions of inner shroud segment 35 can be employed at release for the benefit of seals that are typically formed at circumferential edges of inner shroud segments. Thus, it should be understood that cooling configurations of the present disclosure may include multiple such cooling channels 60, such as, for example, 6, 10, 20 or more. According to certain preferred embodiment, the multiple cooling channels 60 may be arranged in a parallel configuration so that their respective outlets 63 are spaced along the length of slot 57 and, thereby, provide even cooling over the length of seal 69 and sealing member 58. Further, the multiple cooling channels 60 may be arranged according to an alternating counterflow arrangement in which adjacent cooling channels 60 have flow directions that are oppositely oriented, i.e., so that coolant flows in the opposite directions. In this way, the multiple impingement outlets 63 may be desirably spaced along the length of slots 57 formed on both circumferential edges 48, 50 of inner shroud segment 35.

The disclosed cooling configurations and seals for hot gas path components, e.g., inner shroud segment 35, have been found to cool using less coolant as well as improve sealing characteristics, respectively, compared with conventional cooling configurations and seals, resulting in reduced costs associated with cooling, greater engine efficiency, and lower maintenance costs. As will be appreciated, the internal cooling and sealing configurations of the present invention may be formed in hot gas path components, such as inner shroud segment 35, via any conventional manufacturing technique, including electrical discharge machining, drilling, casting, additive manufacturing, a combination thereof, or any other technique.

As one of ordinary skill in the art will appreciate, the many varying features and configurations described above in relation to the several exemplary embodiments may be further selectively applied to form the other possible embodiments of the present disclosure. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A turbine of a gas turbine engine, the turbine comprising a stationary shroud ring that includes inner shroud segments circumferentially stacked about a hot gas path, wherein the inner shroud segments includes a first inner shroud segment that comprises:

a cooling configuration that includes cooling channels configured to receive and direct a coolant through an interior of the first inner shroud segment, each of the cooling channels extending lengthwise between a first end and a second end, wherein the second end comprises an outlet formed through an exterior surface of the first inner shroud segment;

a circumferential edge;

a slot formed in the circumferential edge; and a sealing member positioned within the slot, wherein the slot includes an outboard ceiling positioned radially outward from the sealing member;

wherein the outlet of at least one of the cooling channels is positioned within the outboard ceiling of the slot.

2. The turbine according to claim 1, wherein a cooling channel group comprises a plurality of the cooling channels;

wherein the outlets of each the cooling channels within the cooling channel group are positioned within the slot;

wherein the first inner shroud segment comprises:

opposed first and second circumferential edges, the circumferential edge comprising one of the first and second circumferential edges;

opposed leading and trailing edges extending between the first and second circumferential edges; and opposed inner and outboard faces extending between the leading and trailing edges and the first and second circumferential edges, the inner face being directed in an inboard direction toward the hot gas path and an outboard face being directed in an outboard direction.

3. The turbine according to claim 2, wherein the turbine comprises a center axis relative to which an axial direction, radial direction, and circumferential direction are defined; and wherein the first inner shroud segment is oriented such that:

the leading and trailing edges are offset in the axial direction, with the offset therebetween defining a width of the first inner shroud segment;

the first and second circumferential edges are offset in the circumferential direction, with the offset therebetween defining a length of the first inner shroud segment; and the inner and outboard faces are offset in the radial direction, with the offset therebetween defining a height of the first inner shroud segment.

4. The turbine according to claim 3, wherein the slot on the circumferential edge extends lengthwise between the leading and trailing edges of the first inner shroud segment;

wherein the sealing member extends lengthwise within the slot from a first position at the leading edge to a second position at the trailing edge of the first inner shroud segment;

wherein each of the cooling channels within the cooling channel group extends across at least 75% of the length of the first inner shroud segment; and wherein the first end of each of the cooling channels within the cooling channel group comprises an inlet formed through the outboard face of the first inner shroud segment.

5. The turbine according to claim 3, wherein the slot on the circumferential edge extends lengthwise between the leading and trailing edges of the first inner shroud segment;

wherein the sealing member extends lengthwise within the slot from a first position at the leading edge to a second position at the trailing edge of the first inner shroud segment;

wherein each of the cooling channels within the cooling channel group extends across at least 50% of the length of the first inner shroud segment;

wherein the slot is defined between the outboard ceiling, which defines a boundary in the outboard direction, and a floor, which defines a boundary in the inboard direction; and wherein the outlets of each the cooling channels within the cooling channel group are formed through the outboard ceiling of the slot.

6. The turbine according to claim 5, wherein the outboard ceiling the slot comprises a beveled portion adjacent to the circumferential edge; and wherein the outlets of each the cooling channels within the cooling channel group are formed through the beveled portion of the outboard ceiling of the slot.

7. The turbine according to claim 5, wherein the cooling channel group comprises at least six of the cooling channels;

wherein the outlets of each of the cooling channels within the cooling channel group are aimed so that an initial trajectory of coolant being released therefrom comprises a directional component in the inboard direction; and wherein the outlets of the cooling channels within the cooling channel group are spaced between the leading and trailing edges of the inner shroud segment.

8. The turbine according to claim 5, wherein the outlets of each of the cooling channels within the cooling channel group are aimed at the sealing member positioned within the slot; and wherein the outlets of each of the cooling channels within the cooling channel group comprise a radial position that is outboard relative to the sealing member.

9. The turbine according to claim 8, wherein the sealing member comprises opposed inner and outboard faces, the outboard face being directed in the outboard direction;

wherein the outlets of each of the cooling channels within the cooling channel group are aimed at the outboard face of the sealing member;

wherein each of the outlets of the cooling channels within the cooling channel group comprises an impingement outlet configuration;

wherein, defined relative to a reference cooling channel having a reference outlet, the impingement outlet configuration comprises a configuration in which the reference outlet has a cross-sectional flow area that is less than 60% of a cross-sectional flow area of the reference cooling channel.

10. An inner shroud segment for use in a stationary shroud ring encircling a hot gas path of a gas turbine engine, the inner shroud segment comprising:

a cooling configuration that includes cooling channels configured to receive and direct a coolant through an interior of the inner shroud segment, each of the cooling channels extending lengthwise between a first end and a second end that comprises an outlet formed through an exterior surface of the inner shroud segment;

opposed first and second circumferential edges; and first and second slots formed in the first and second circumferential edges, respectively, for receiving a sealing member, the first slot and the second slot each comprising an outboard ceiling;

wherein:
the outlet of at least one of the cooling channels is positioned within the outboard ceiling of the first slot; and
the outlet of at least one of the cooling channels is positioned within the second the outboard ceiling of the slot.

11. The inner shroud segment according to claim 10, wherein a first cooling channel group comprises a plurality of the cooling channels, and a second cooling channel group comprises a plurality of the cooling channels;
wherein:
the outlets of each of the cooling channels within the first cooling channel group comprise a position within the first slot; and
the outlets of each of the cooling channels within the second cooling channel group comprise a position within the second slot.

12. The inner shroud segment according to claim 11, wherein the inner shroud segment comprises:
opposed leading and trailing edges extending between the first and second circumferential edges; and
opposed inner and outboard faces extending between the leading and trailing edges and the first and second circumferential edges;
wherein:
an offset between the first and second circumferential edges defines a length of the inner shroud segment;
an offset between the leading and trailing edges defines a width of the inner shroud segment; and
an offset between the inner and outboard faces defines a height of the inner shroud segment;
wherein each of the cooling channels of the first and second cooling channel groups extends across at least 50% of the length of the inner shroud segment.

13. The inner shroud segment according to claim 12, wherein the first slot on the first circumferential edge extends lengthwise between the leading and trailing edges of the inner shroud segment;
wherein the second slot on the second circumferential edge extends lengthwise between the leading and trailing edges of the inner shroud segment; and
wherein:
the outlets within the first slot are spaced between the leading and trailing edges of the inner shroud segment; and
the outlets within the second slot are spaced between the leading and trailing edges of the inner shroud segment.

14. The inner shroud segment according to claim 13, wherein each of the first and second slots is defined between the outboard ceiling and, opposed to the outboard ceiling, a floor, wherein the ceiling and floor are approximately parallel to the outboard and inner faces, respectively;
wherein:
the outlets of the cooling channels within the first cooling channel group are each formed through the outboard ceiling of the first slot; and
the outlets of the cooling channels within the second cooling channel group are each formed through the ceiling of the second slot.

15. The inner shroud segment according to claim 14, wherein each of the outlets of the cooling channels within the first and second cooling channel groups comprises an impingement outlet configuration;
wherein the cooling channels of the first and second cooling channel groups are:
approximately parallel to each other; and
arranged according to an alternating counterflow arrangement in which adjacent ones of the cooling channels have oppositely oriented flow directions.

16. A turbine of a gas turbine engine, the turbine comprising a seal formed at an interface defined between adjacent first and second inner shroud segments that, together, form a portion of a stationary shroud ring encircling a hot gas path, wherein the interface is formed between abutting first and second circumferential edges of the first and second inner shroud segments, respectively, the seal comprising:
first and second slots disposed on the first and second circumferential edges, respectively, the first and second slots cooperatively forming a seal chamber spanning across the interface, wherein the first slot and the second slot each comprise an outboard ceiling;
a sealing member positioned within the seal chamber, the sealing member correspondingly shaped with the seal chamber such that operable engagement therewithin maintains the sealing member positioned across the interface; and
cooling channels formed within each of the first and second inner shroud units, each of the cooling channels extending lengthwise between a first end and second end that comprises an outlet;
wherein:
a first cooling channel group comprises a plurality of the cooling channels formed within the first inner shroud segment; and
a second cooling channel group comprises a plurality of the cooling channels formed within the second inner shroud segment;
wherein:
the outlets of the cooling channels within the first cooling channel group each comprises a position within the outboard ceiling of the first slot; and
the outlets of the cooling channels within the second cooling channel group each comprises a position within the outboard ceiling of the second slot.

17. The turbine according to claim 16, wherein the first and second inner shroud segment each comprises:
opposed leading and trailing edges extending between the first and second circumferential edges; and
opposed inboard and outboard faces extending between the leading and trailing edges and the first and second circumferential edges;
wherein the turbine comprises a shaft through which a center axis is defined, where an axial direction, radial direction, and circumferential direction are defined relative to the center axis; and
wherein each of the first and second inner shroud segment are oriented such that:
the leading and trailing edges are offset in the axial direction, with the offset therebetween defining a width;
the first and second circumferential edges are offset in the circumferential direction, with the offset therebetween defining a length; and
the inboard and outboard faces are offset in the radial direction, with the offset therebetween defining a height;
wherein the inboard face faces in an inboard direction toward the hot gas path and the outboard face faces in an outboard direction; and
wherein each of the cooling channels of the first and second cooling channel groups extends across at least 50% of the length of the respective one of the first and second inner shroud segments.

18. The turbine according to claim 17, wherein each of the first and second slots is defined between a respective outboard ceiling, which defines a boundary in the outboard direction, and a respective floor, which defines a boundary in the inboard direction; and wherein the outlets of each the cooling channels within the first and second cooling channel groups are formed through the respective outboard ceiling of the respective one of the first and second slots.

19. The turbine according to claim 18, wherein the outlets of each of the cooling channels within the first and second cooling channel groups are aimed so that an initial trajectory of coolant released therefrom comprises a directional component in the inboard direction.

20. The turbine according to claim 18, wherein the sealing member comprises opposed inner and outboard faces, where the outboard face faces the outboard direction;

wherein the outlets of each of the cooling channels within the first and second cooling channel groups are aimed at the outboard face of the sealing member; and wherein each of the outlets of the cooling channels within the first and second cooling channel groups comprises an impingement outlet configuration.

\* \* \* \* \*